Nov. 21, 1944.  L. C. PESKIN  2,363,260
BEARING FOR ROPE STRANDING MACHINES
Filed Oct. 10, 1941  3 Sheets-Sheet 1
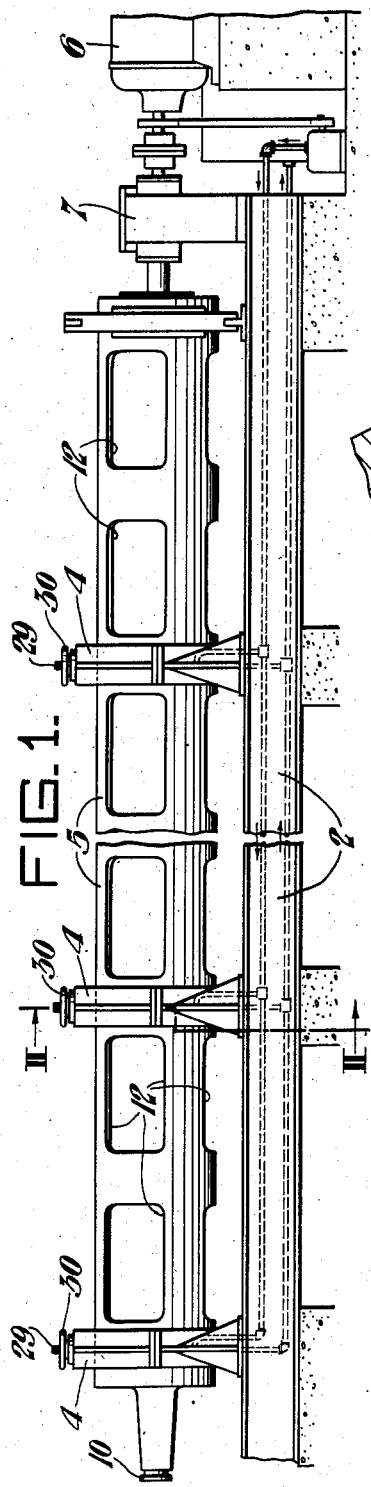
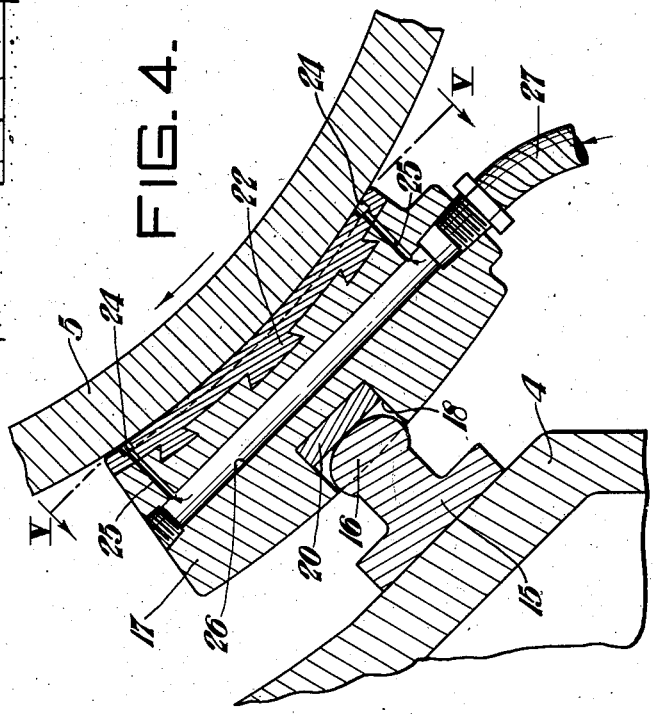
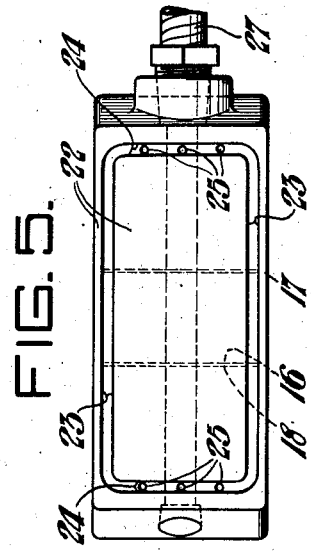
Inventor:
LEONARD C. PESKIN,
by: John E. Jackson
his Attorney.

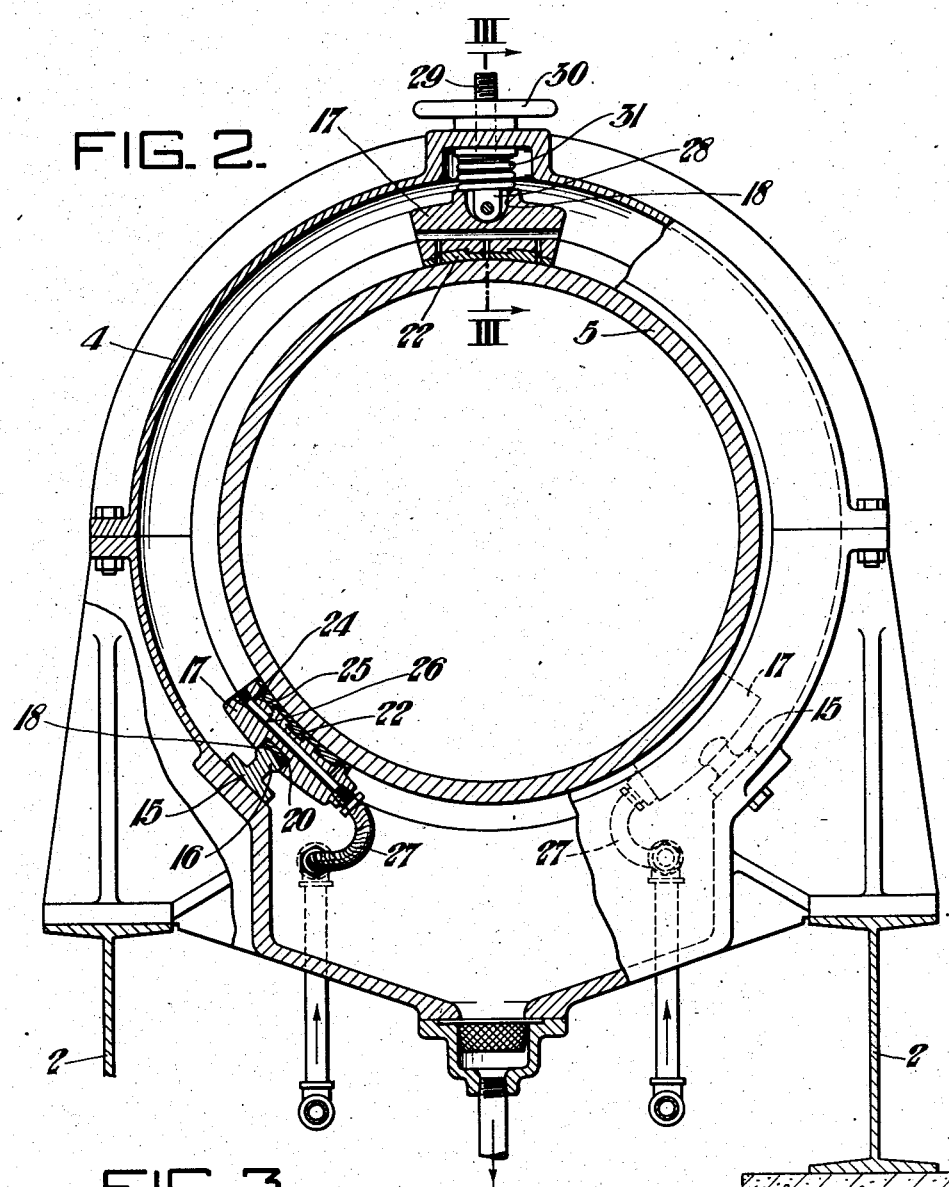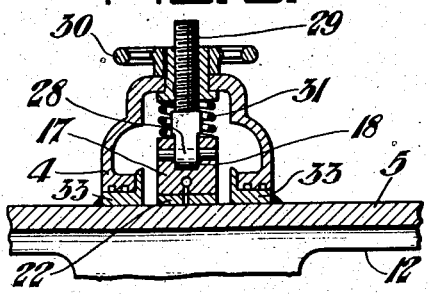

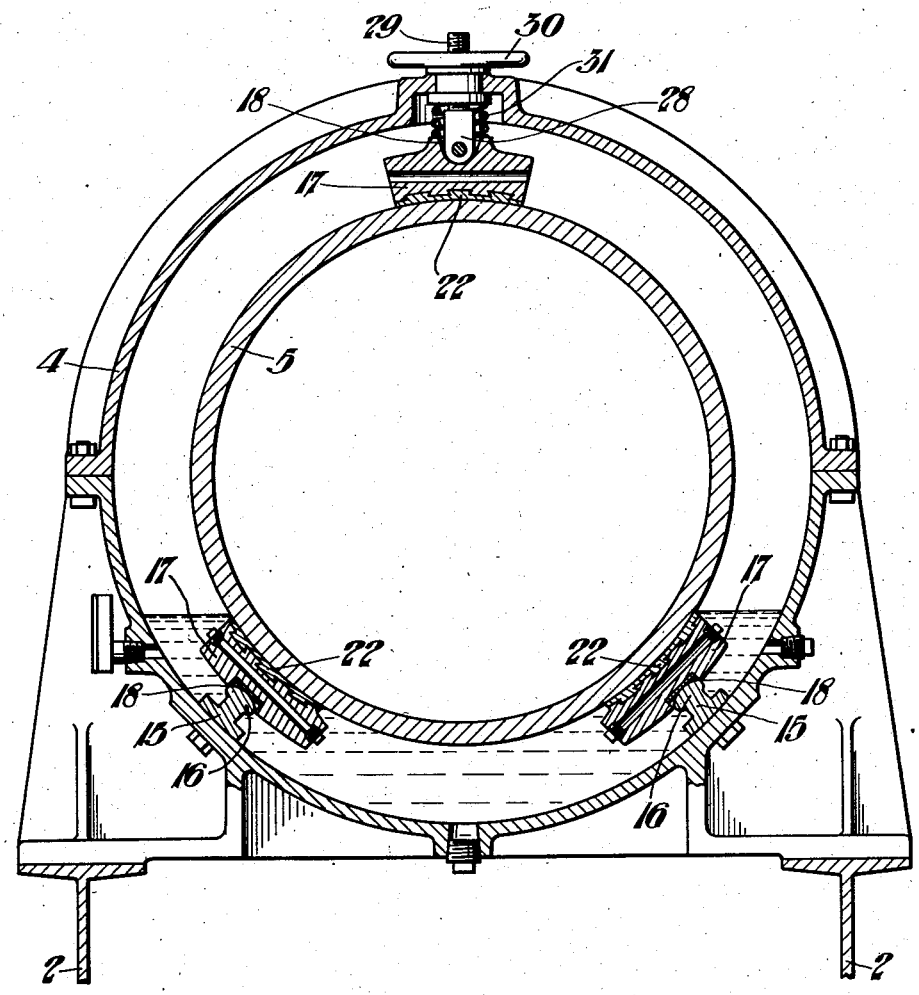

Patented Nov. 21, 1944

2,363,260

UNITED STATES PATENT OFFICE 2,363,260

BEARING FOR ROPE STRANDING MACHINES

Leonard C. Peskin, Shaker Heights, Ohio, assignor to The American Steel and Wire Company of New Jersey, a corporation of New Jersey Application October 10, 1941, Serial No. 414,526

4 Claims. (Cl. 308—73)

This invention relates to rope stranding machines, and more particularly to those which are adapted to operate at high speeds.

In rope stranding machines, there is usually a horizontally disposed hollow rotor which carries within it a large number of spools of wire on axes substantially perpendicular thereto, the wires from the spools being drawn through apertures in a die plate at one end of the rotor during the rotation of the latter and twisted into a rope. The rotors of these machines are rotated at very high speeds, which gives rise to numerous difficulties. Ordinarily the rotor is supported from underneath by a pair of spaced roll bearings the axes of which are substantially parallel with the axis of the rotor, and the rotor is held thereagainst by its gravitational weight with or without any roll bearing mounted for contact with the top of the rotor. Because of the problems of dynamically balancing the rotor, such construction seriously limits the productive capacity of the machine.

When using roll bearings for the purpose stated, the rotor is not truly confined, but maintains contact with the rolls mereby by virtue of its gravitational weight. As the rotor begins to revolve, centrifugal or dynamic forces come into play as a result of unbalanced forces which may be left in the rotor. These unbalanced forces come about due to lack of symmetry in the rotor, elastic distortion, improper machining and assembling, etc. Should the component of the centrifugal forces at any roll bearing arising due to these unbalanced forces, exceed that portion of the gravitational weight of the rotor supported by the roll in question, the rotor will lift from its bearing momentarily in each revolution and return to make contact with great violence and shock. The repeated impacts resulting from such behavior of the rotor result in damage to the roll and rotor surface, requiring frequent maintenance work, great vibration causing breakage of fine rope wires, and damage to other parts of the mechanism, as well as noise of such intensity as to lead to difficult working condtions.

While theoretically rotors can be perfectly dynamically balanced at one operating speed to operate smoothly, this procedure is time-consuming, costly, and requires maintenance of the equipment in excess of that found practical, at least for rope stranding machines. Also, since the centrifugal forces resulting from rotation increase as the square of the angular velocity of the rotor, a permissible amount of unbalance at one speed may become entirely prohibitive at a slightly higher speed.

It is among the objects of the present invention to provide a rope stranding machine of the type described which will operate with a minimum of maintenance, vibration, and noise at increased speeds.

Another object is to provide a rope stranding machine which is so constructed and arranged that theoretically perfect dynamic balance of the rotor is entirely unnecessary; it being understood, of course, that practically perfect dynamic balance is never fully obtained.

The foregoing and other objects will be apparent after referring to the drawings, in which:

Figure 1 is an elevation of the rotor of a rope stranding machine showing the apparatus of my invention associated therewith.

Figure 2 is an enlarged sectional elevation taken on the line II—II of Figure 1.

Figure 3 is a section taken on the line III—III of Figure 2.

Figure 4 is an enlarged section through the lower bearing instrumentalities and the support therefor.

Figure 5 is a plan of one of the bearing instrumentalities.

Figure 6 is a view similar to that of Figure 2 but disclosing a modification.

Referring more particularly to the drawings, the numeral 2 generally designates the bed of a rope stranding machine. At suitably spaced intervals along the bed 2 is a plurality of bearing housings 4. Disposed to extend through the bearing housings 4 is a rotor 5 which is driven by a motor 6 through a speed reducer 7. Conventionally, the horizontally disposed rotor 5 is supported by roll bearings (not shown) which occupy the bearing housings 4 and bear against the said rotor at suitably spaced intervals (for example, 120°), and rotate on axes which are substantially parallel thereto.

The horizontally disposed rotor 5 is adapted to receive within the interior thereof cradles which carry spools of wire on axes substantially perpendicular thereto, said wire being drawn through a twister head 10 at one end of the hollow rotor and twisted into a rope or cable. The spool-carrying cradles are disposed opposite windows 12 in the hollow rotor 5, and it is through these windows that the spools are replaced. The combined horizontally disposed rotor 5, spool-carrying cradles, and driving instrumentalities for the latter, are known as "flyers," but as such form no part of the present invention.

In each of the bearing housings 4 there is provided a series of bearing elements which is disposed to contact the rotor 5 at suitably spaced intervals, and to produce independent convergent oil films which develop very high radial pressures and serve to hold the rotor against radial displacement. These independent convergent oil films are wedge-shaped, tapering in the direction of rotation, and the load rides on them rather than on the metal of which the bearing elements are composed. The bearing elements are fulcrumed at their approximate centers to provide sufficient flexibility to permit them to rock or fulcrum on lines which are perpendicular to the axis of the rotor, as will appear more fully hereinafter.

According to the teachings of the present invention, there is provided adjacent the bottom of each of the bearing housings 4, and on opposite sides thereof, a pedestal 15 having a stud 16 which extends toward the axis of the hollow rotor 5 and provides a supporting surface. On each of the studs 16 there is carried a bearing shoe 17 having a recess 18 within which the supporting surface of the stud is adapted to seat.

As shown more clearly in Figure 5, the recess 18 is substantially rectangular and provided with flat and straight side walls; and the stud 16 is substantially rectangular in plan and provided with straight and flat ends. This prevents the rocking movement of the bearing shoes 17 in a plane through the axis of the rotor 5. The sides of the studs 16 are curved, as shown more clearly in Figure 4, to thus permit rocking movement of the bearing shoe 17 in a plane at right angles to the axis of the rotor. In addition, there is provided a slight clearance between the outer ends of each of the studs 16 and the bottom of the rectangular-shaped recess 18. Such construction permits a very slight movement of each of the bearing shoes 17 in a plane parallel to the axis of the rotor 5. This slight movement may follow from any buckling movements of the rotor 5 due to uneven loading of the rotor with heavily loaded spools or reels of wire. At the bottom of each bearing recess 18 there is provided a wear plate 20. Those faces of the bearing shoe 17 which are most adjacent to the hollow rotor 5 carry rectangular babbitt pads 22. Adjacent each edge of each of the babbitt pads 22 there is a groove 23 which extends peripherally of the hollow rotor 5. These grooves 23 are connected at their ends by transverse grooves 24. Disposed at spaced intervals in the transverse grooves 24 are oil holes 25 which communicate with an oil passage 26 extending longitudinally of the bearing shoe 17. Thus each of the transverse grooves 24 provides therein three equally spaced oil holes 25, but the oil holes are omitted from the grooves 23 and also the central portion of the bearing area. It is found that this arrangement provides for improved lubrication. Through the oil passage 26 oil may be fed under pressure through oil conduits 27.

As the hollow rotor 5 acquires a high speed of rotation, the bearing shoes 17 will tilt in such manner that the ends thereof which extend in the direction of rotation of the rotor will be in closer contact therewith than the rearward end of the said bearing shoe, thus providing the wedge-shaped oil film referred to.

While not shown in Figure 4, the two bearing shoes 17 which are disposed adjacent the bottom of the bearing housings 4 and on opposite sides thereof, may have provision for adjustment of position with respect to the hollow rotor 5. Further, this adjustment is accommodated by the upper bearing shoe, also designated at 17, and within the bearing recess 18, of which there is disposed a spherical boss 28 which is carried on the end of a shaft 29 which extends through the bearing housing 4 and is provided on its outer end with screw threads, to accommodate a handwheel 30. Between the inner face of the bearing housing 4 and the adjacent side of the upper bearing shoe 17 is a spring 31 which may be used to hold the said bearing shoe in adjusted position. By this means the upper bearing shoe is radially adjustable, in order that the unitary pressure of all the bearing shoes 17 may be properly compensated and the position of shoes 17 properly aligned with respect to rotor 5.

Referring more particularly to Figure 6, I have disclosed a modification which comprises a splash lubricating system in lieu of the pressure lubricating system of Figures 2 through 5.

There is provided at either side of the bearing shoe 17 a ring 33 which is carried by the rotor 5. These rings 33, in combination with the housings for the bearing shoe 17, provide a labyrinth type of seal.

While I have shown and described one specific embodiment of the present invention, it will be understood that I do not wish to be limited exactly thereto, since various modifications may be made without departing from the scope of the invention as defined by the following claims.

I claim:

1. A bearing for high speed spindles and the like comprising a rectangular-shaped body member having a curved bearing surface, a bearing portion of relatively soft metal carried by said bearing surface, said bearing surface having a continuous groove arranged therein around the bearing portion thereof, and a passageway arranged in said body member through which a lubricating medium is adapted to be introduced thereinto, said body member having a plurality of holes arranged therein adjacent each end thereof connecting said groove and said passageway whereby a lubricating medium is supplied from said passageway into said groove and to the bearing portion of said bearing.

2. In combination with a high speed rotor or the like, a plurality of spaced apart bearing assemblies arranged throughout the length of the rotor, each of said bearing assemblies comprising a circular supporting means, a plurality of bearing shoes carried by said supporting means for rotatably supporting the rotor, means carried by said supporting means for pivotally supporting at least some of said bearing shoes on said supporting means whereby the same are adapted for rocking movement solely in a plane substantially perpendicular to the axis of the rotor and prevented from rocking movement in a plane through the axis thereof, at least one of said bearing shoes having a groove arranged around the bearing area thereof, said bearing shoe having a passageway arranged therein for conveying a lubricating medium thereinto, a plurality of holes arranged in said bearing shoe at each end thereof connecting said groove with said passageway, and means connected to said passageway for supplying a lubricating medium thereinto from a source of supply.

3. In combination with a high speed rotor or the like, a plurality of spaced apart bearing assemblies arranged throughout the length of the rotor, each of said bearing assemblies comprising a circular supporting means, a plurality of bearing shoes carried by said supporting means for rotatably supporting the rotor, means carried by said supporting means for pivotally supporting at least some of said bearing shoes on said supporting means whereby the same are adapted for rocking movement solely in a plane substantially perpendicular to the axis of the rotor and prevented from rocking movement in a plane through the axis thereof, said last mentioned means consisting of a member having a substantially rectangular-shaped head disposed so that the longest dimension thereof is substantially parallel to the axis of the rotor with the rectangular-shaped head of each of said members being disposed in a rectangular-shaped opening arranged in the outer side of the bearing shoe centrally thereof whereby the bearing shoe will tilt upon rotation of the rotor only in the direction of rotation thereof so as to provide a substantially wedge-shaped oil film between the bearing area of the bearing shoe and the rotor upon which film the rotor is adapted to ride during the rotation thereof, at least one of said bearing shoes having means arranged therewith for adjusting the same radially relative to the other of said bearing shoes and to said rotor, and means for supplying a lubricating medium to the bearing area of at least one of said bearing shoes.

4. In combination with a high speed rotor or the like a plurality of spaced apart bearing assemblies arranged throughout the length of the rotor, each of said bearing assemblies comprising a supporting means, at least one bearing shoe carried by said supporting means for rotatably supporting the rotor, means carried by said supporting means for pivotally supporting said bearing shoe on said supporting means whereby the same is adapted for rocking movement solely in a plane substantially perpendicular to the axis of the rotor and prevented from rocking movement through the axis thereof, said bearing shoe having a groove arranged around the bearing area thereof, said bearing shoe having a passageway arranged therein for conveying a lubricating medium thereinto, a plurality of holes arranged in said bearing shoe at each end thereof connecting said groove with said passageway, and means connected to said passageway for supplying a lubricating medium thereinto from a source of supply.

LEONARD C. PESKIN.